(12) United States Patent
Kwon et al.

(10) Patent No.: US 12,208,708 B2
(45) Date of Patent: Jan. 28, 2025

(54) SEAT RAIL RETAINER

(71) Applicants: Hyundai Motor Company, Seoul (KR); Kia Corporation, Seoul (KR); DAE WON SAN UP CO., LTD, Ansan-si (KR)

(72) Inventors: Tae Jun Kwon, Incheon (KR); Hyun Ko, Suwon-si (KR); Hyun Kyu Moon, Incheon (KR); Min Seok Kim, Hwaseong-si (KR); Sang Do Park, Suwon-si (KR); Tae Su Kim, Yongin-si (KR); Sang Hyun Lee, Hwaseong-si (KR); Yong Chul Jang, Ansan-si (KR)

(73) Assignees: HYUNDAI MOTOR COMPANY, Seoul (KR); KIA CORPORATION, Seoul (KR); DAE WON SAN UP CO., LTD, Ansan-si (KR)

( * ) Notice: Subject to any disclaimer, the term of this patent is extended or adjusted under 35 U.S.C. 154(b) by 115 days.

(21) Appl. No.: 18/074,771

(22) Filed: Dec. 5, 2022

(65) Prior Publication Data
US 2024/0025307 A1     Jan. 25, 2024

(30) Foreign Application Priority Data
Jul. 20, 2022    (KR) .................. 10-2022-0089625

(51) Int. Cl.
*B60N 2/07* (2006.01)
(52) U.S. Cl.
CPC .................. *B60N 2/0722* (2013.01)

(58) Field of Classification Search
CPC ...... B60N 2/0722; B60N 2/07; B60N 2/0705; B60N 2/06; B60N 2/0735; B60M 2/0715
USPC ......................................... 248/429
See application file for complete search history.

(56) References Cited

U.S. PATENT DOCUMENTS

| | | | | |
|---|---|---|---|---|
| 5,224,781 A | * | 7/1993 | Rohee ................ | B60N 2/0715 384/34 |
| 2003/0094558 A1 | * | 5/2003 | Yamada .............. | B60N 2/0818 248/429 |
| 2005/0285007 A1 | * | 12/2005 | Tanaka ............... | B60N 2/0843 248/429 |
| 2012/0061547 A1 | * | 3/2012 | Moriyama .......... | B60N 2/0843 248/430 |
| 2018/0001791 A1 | * | 1/2018 | Kume ................. | B60N 2/0722 |
| 2018/0086231 A1 | * | 3/2018 | Kume ................. | B60N 2/0722 |

FOREIGN PATENT DOCUMENTS

KR    10-2019-0078369 A    7/2019

* cited by examiner

*Primary Examiner* — Christopher Garft
(74) *Attorney, Agent, or Firm* — Morgan, Lewis & Bockius LLP

(57) ABSTRACT

A seat rail retainer includes a body, among a first rail and a second rail that are disposed to slide straightly respectively in a longitudinal direction, the body being fixed to the first rail, an elastic supporting portion protruding from the body to be elastically pressed by the second rail, and an inserting body inserted into the body to provide an elastic force to the elastic supporting portion.

15 Claims, 4 Drawing Sheets

SEAT RAIL RETAINER

CROSS REFERENCE TO RELATED APPLICATION

The present application claims priority to Korean Patent Application No. 10-2022-0089625, filed Jul. 20, 2022, the entire contents of which is incorporated herein for all purposes by this reference.

BACKGROUND OF THE PRESENT DISCLOSURE

Field of the Present Disclosure

The present disclosure relates to a structure of a retainer used with a seat rail.

Description of Related Art

A seat of a vehicle may be provided to be variable in a position thereof by sliding straightly on a seat rail.

The seat rail includes a lower rail and an upper rail, and the lower rail is fixed to a vehicle body floor and the upper rail is fixed to the seat. As the upper rail slides slightly with respect to the lower rail, the seat is configured to slide slightly.

To perform efficient and smooth straight sliding of the upper rail with respect to the lower rail as described above and to prevent generation of vibration and noise, a retainer is provided between the lower rail and the upper rail to maintain a proper interval and guide relatively straight sliding.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a seat rail retainer configured to maintain an interval between a lower rail and an upper rail constant, and to achieve smooth and efficient relatively straight sliding, to prevent a stuck or deformed state even when being left for a long time so as continuously effectively prevent the occurrence of an excessive operational force to the straight sliding of the lower rail and the upper rail or the occurrence of vibration and noise.

In various aspects of the present disclosure, there is provided a seat rail retainer including: a body, among a first rail and a second rail which may be disposed to slide straightly respectively in a longitudinal direction, the body being fixed to the first rail; an elastic supporting portion protruding from the body to be elastically pressed by the second rail; and an inserting body inserted into the body to provide an elastic force to the elastic supporting portion.

The elastic supporting portion may have a bridge shape of which opposite end portions may be connected to the body and a center portion may protrude.

The opposite end portions of the elastic supporting portion may be spaced from each other in a longitudinal direction of the second rail, so that the elastic supporting portion may be formed long in the longitudinal direction of the second rail.

The inserting body may be inserted into the center portion of the bridge-shaped elastic supporting portion and the body.

The opposite end portions of the elastic supporting portion may be integrally connected to the body, and the center portion thereof may be formed in a curved surface protruding to be brought into contact with the second rail.

The elastic supporting portion may be formed long in a longitudinal direction of the second rail.

The block-shaped inserting body may be inserted into a space between the center portion of the elastic supporting portion and the body.

A plurality of elastic supporting portions may be provided at the body; and the inserting body may be inserted into the body to supply the elastic force to at least one of the plurality of elastic supporting portions.

The elastic supporting portions may include: a side elastic supporting portion configured to press sideways the second rail; and a lower elastic supporting portion configured to press the second rail at a lower side of the second rail.

The inserting body may be inserted into an insertion groove provided between the side elastic supporting portion and the body.

The lower elastic supporting portion may be provided to cover at least some of an upper portion of the insertion groove; and the inserting body may have an upper supporting portion which may be configured to elastically support upward the lower elastic supporting portion while being inserted into the insertion groove.

The body and the elastic supporting portion may be integrally formed of the same material; and the inserting body may be formed of a different material from the body.

The body and the elastic supporting portion may be made of plastic injection molding; and the inserting body may be made of rubber.

A seat rail retainer may include: a body fixed to a first rail; a plurality of elastic supporting portions protruding from the body toward a second rail to elastically support the second rail configured to slide straightly with respect to the first rail; and an inserting body provided between the body and the plurality of elastic supporting portions to supply an elastic force to at least one of the elastic supporting portions.

The body may include a mounting groove inserted into and fixed to the first rail; and the plurality of elastic supporting portions may include a side elastic supporting portion supporting a side surface of the second rail and a lower elastic supporting portion supporting a lower surface of the second rail.

Each of the side elastic supporting portion and the lower elastic supporting portion may have an arc bridge shape in which opposite end portions thereof may be connected to the body and formed long in a longitudinal direction and a center portion thereof may protrude.

An insertion groove may be formed in a portion between the body and the side elastic supporting portion, so that the inserting body may be inserted into the insertion groove; and the inserting body may have a block shape inserted into the insertion groove.

The inserting body may be inserted into the insertion groove and be configured to elastically support the side elastic supporting portion, and furthermore, be configured to press upward the lower elastic supporting portion.

The lower elastic supporting portion may be formed to cover some portion of an upper portion of the insertion groove to allow the inserting body to be inserted into the insertion groove from above and to receive an elastic force supplied from the inserting body inserted in the insertion groove.

The present disclosure is configured to maintain an interval between a lower rail and an upper rail constant, to achieve smoothly efficiently relatively straight sliding of the lower rail and the upper rail, to prevent a stuck or deformed state even when being left in a long time, so that the occurrence of excessive operational force to straight sliding of the lower rail and the upper rail and the occurrence of vibration and noise may be continuously effectively prevented.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
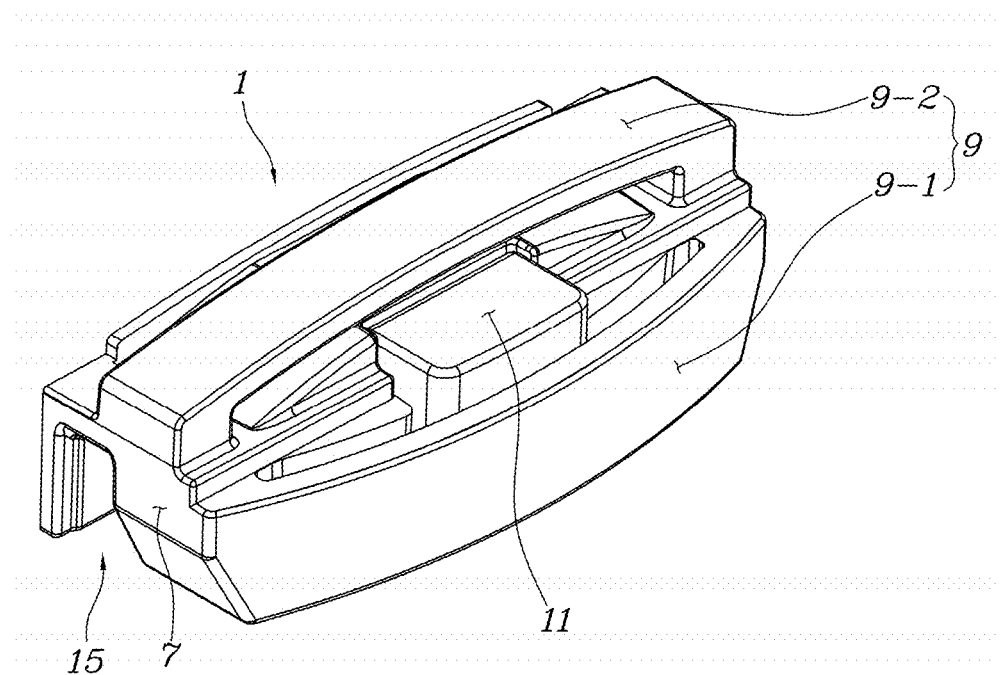
FIG. 1 is a view showing a seat rail retainer according to an exemplary embodiment of the present disclosure.
Figure 2:
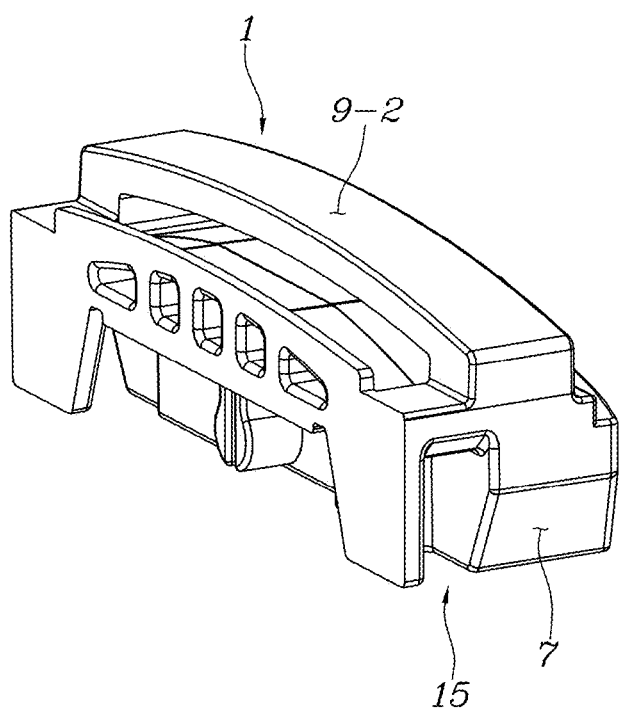
FIG. 2 is a view showing the opposite side to FIG. 1.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to a same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinbelow, an exemplary embodiment described in the specification will be described in detail with reference to accompanying drawings, and regardless of the reference numerals, the same reference numerals will refer to the same or like portions, and redundant descriptions thereof will be omitted.

The suffixes "module and "part" for the components used in the following description are provided or mixed in consideration of only the ease of writing the specification, and do not have distinct meanings or roles by themselves.

In the following description, if it is decided that the detailed description of known function or configuration related to the present disclosure makes the subject matter of the present disclosure unclear, the detailed description is omitted. Furthermore, the accompanying drawings are only for understanding of the exemplary embodiments of the present disclosure, and the technical ideas included in the specification are not limited by the accompanying drawings, and those skilled in the art will appreciate that various modifications, additions and substitutions are possible, without departing from the scope and spirit of the present disclosure as included in the accompanying claims.

It will be understood that, although the terms first and/or second, etc. may be used herein to describe various elements, these elements should not be limited by these terms. These terms are only used to distinguish one element, from another element.

It is to be understood that when one element is referred to as being "connected to" or "coupled to" another element, it may be directly connected to or directly coupled to another element or be connected to or coupled to another element, having the other element intervening therebetween. On the other hand, it is to be understood that when one element is referred to as being "directly connected to" or "directly coupled to" another element, it may be connected to or coupled to another element without the other element intervening therebetween.

Singular forms are intended to include plural forms unless the context clearly indicates otherwise.

It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

Furthermore, a unit or a control unit included in names such as a motor control unit (MCU), a hybrid control unit (HCU), etc. is only a widely used term for a controller that is configured to control a specific function of a vehicle, and does not mean a generic function unit.

The controller may include a communication device communicating with other controllers or a sensor to control the function in charge, a memory storing an operation system or a logic command and input/output information, and at least one process performing determination, calculation, and decision necessary for controlling the function in charge.

Referring to FIGS. 1 to 7, a seat rail retainer 1 of the present disclosure includes: a body 7, among a first rail 3 and a second rail 5 that are disposed to slide straightly respectively in a longitudinal direction, the body 7 being fixed to the first rail 3; an elastic supporting portion 9 protruding from the body 7 to be elastically pressed by the second rail 5; and an inserting body 11 inserted into the body 7 to supply an elastic force to the elastic supporting portion 9.

In other words, according to an exemplary embodiment of the present disclosure, relatively straight sliding movement between the first rail 3 and the second rail 5 is guided by the retainer 1, the retainer 1 includes the body 7 and the elastic supporting portion 9 thus elastically supporting and guiding a relative position of the second rail 5 with respect to the first rail 3, and the inserting body 11 is inserted into a gap between the body 7 and the elastic supporting portion 9 to allow the elastic supporting portion 9 to stably secure the elastic force.

Herein, the first rail 3 and the second rail 5 may be respectively a lower rail and an upper rail or an upper rail and a lower rail.

In other words, indicating the first rail 3 and the second rail 5, because the retainer 1 may be provided either of the lower rail and the upper rail, a rail with the retainer 1 fixed is relatively referred to as the first rail 3, and a rail elastically supported by the retainer 1 is referred to as the second rail 5.

For reference, according to the exemplary embodiment of the present disclosure, the first rail 3 is the upper rail and the second rail 5 is the lower rail, and the retainer 1 is provided to the upper rail and the lower rail is elastically supported by the retainer 1.

Of course, because a seat is mounted to the upper rail and the lower rail may be fixed to a vehicle floor, movement of the seat with respect to a vehicle body is performed by straight sliding of the upper rail with respect to the lower rail. Herein, the retainer 1 provided in the upper rail maintains a stable interval between the upper rail and the lower rail and elastically supports the upper rail and the lower rail, so that the smooth and efficient straight sliding may be achieved and generations of vibration and noise may be prevented.

Figure 3:
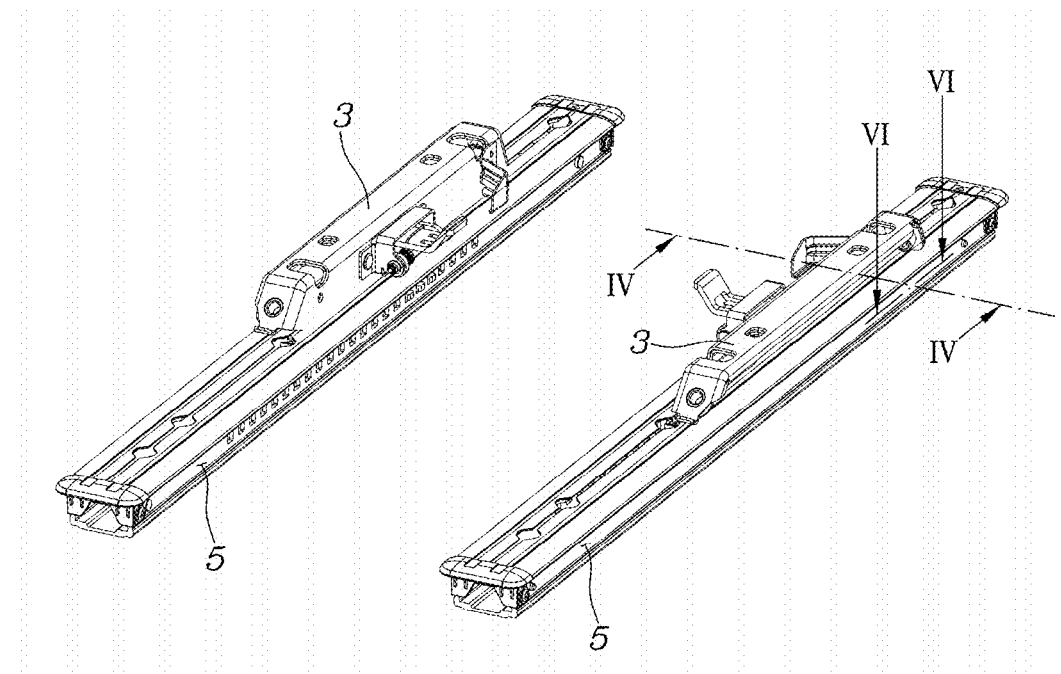
FIG. 3 is a view showing a structure of a seat rail assembly to which the seat rail retainer of the present disclosure is applied.
Figure 4:
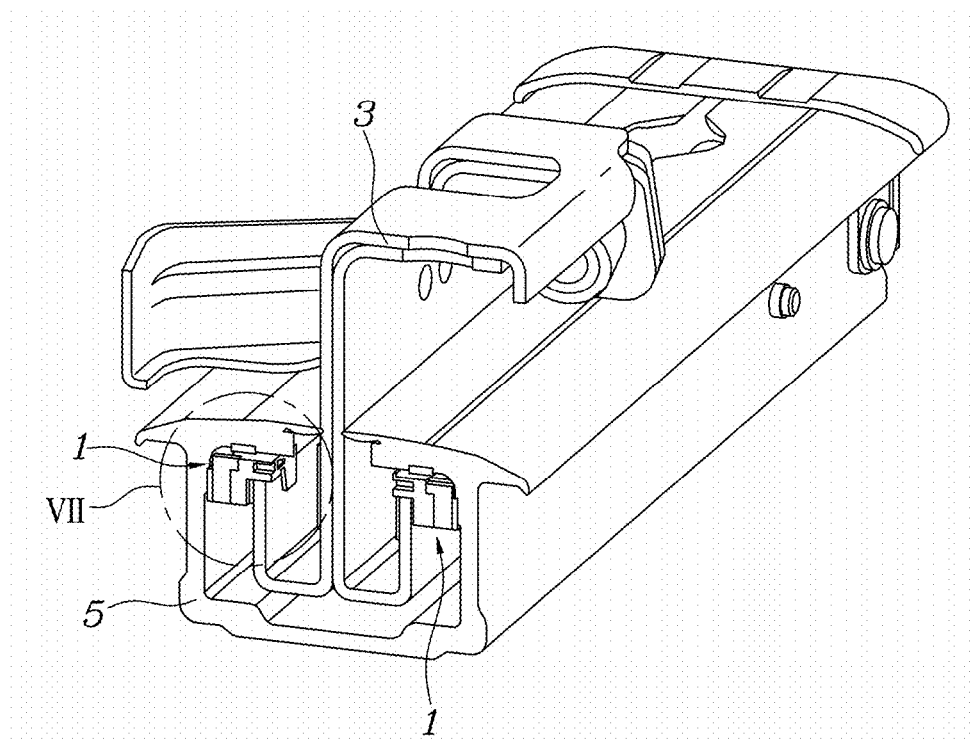
FIG. 4 is a sectional view taken along line III-III of FIG. 3.
Figure 5:
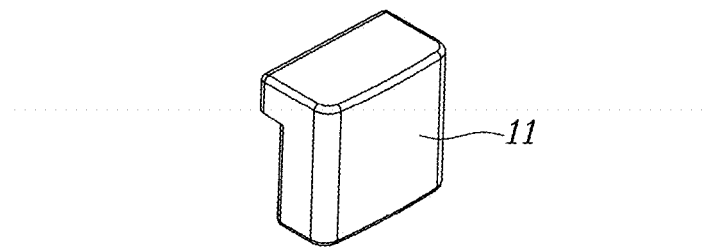
FIG. 5 is a view showing an inserting body inserted into a gap between a body and an elastic supporting portion of the seat rail retainer according to an exemplary embodiment of the present disclosure.
Figure 5:
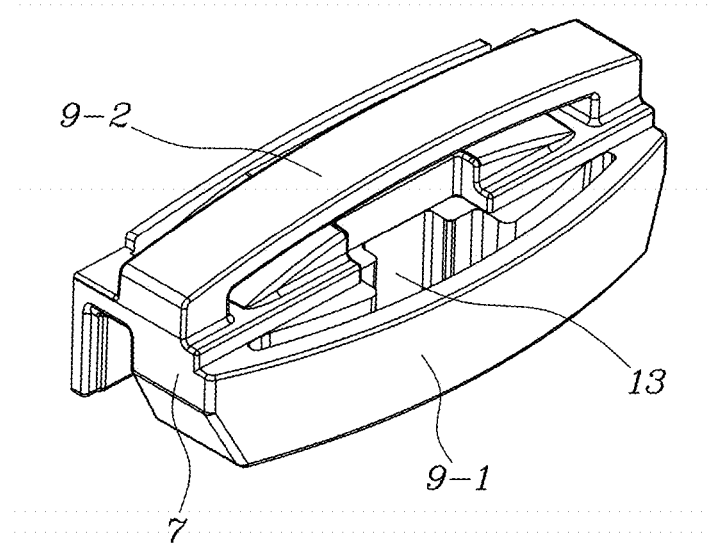
Figure 6:
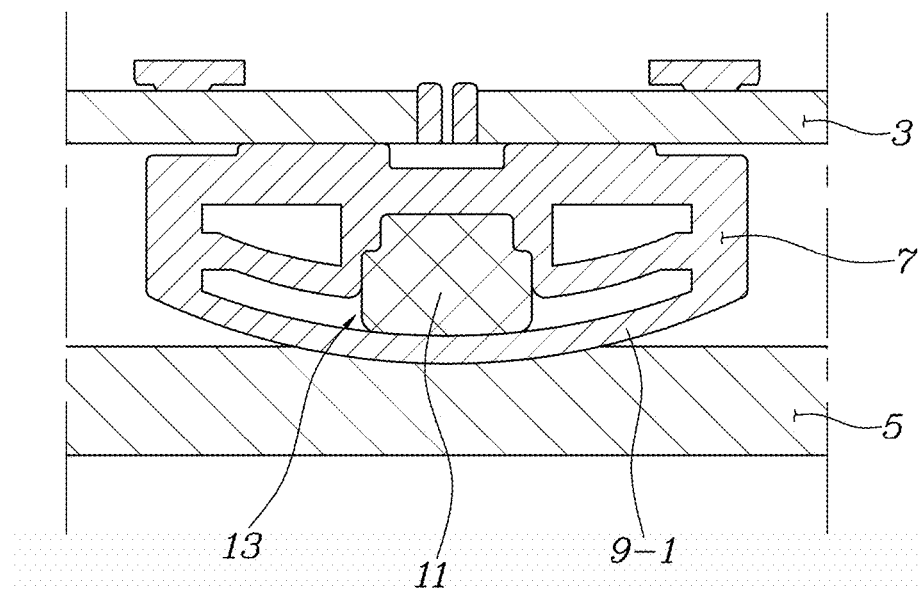
FIG. 6 is a sectional view taken along line VI-VI of FIG. 3.

For reference, FIG. 3 shows a pair of seat rail assemblies provided to a lower portion of the one seat, and the one seat is mounted to upper portions of two upper rails at the opposite sides.

The body 7 and the elastic supporting portion 9 are made of the same material and integrated with each other, and the inserting body 11 is made of a different material from the body 7.

In other words, like the exemplary embodiment of the present disclosure, the body 7 and the elastic supporting portion are composed of plastic injection moldings; and the inserting body 11 may be made of rubber.

Because the body 7 and the elastic supporting portion are made of the plastic injection moldings, the elastic supporting portion may have the elasticity of plastic resin and applies the elastic force to the second rail 5 while being in contact with the second rail 5. However, when the elastic supporting portion made of plastic resin is left for a long time, permanent deformation occurs or the elastic force is lost in many cases.

However, in case of the present disclosure, the rubber inserting body 11 supplies the continuously stable elastic force to the elastic supporting portion 9, and as a result, even when the retainer 1 of the present disclosure is left for a long time, straight sliding elastically guided between the first rail 3 and the second rail 5 is continuously performed, and it is possible to prevent vibration and noise.

According to the exemplary embodiment of the present disclosure, the elastic supporting portion 9 has a bridge shape of which opposite end portions are connected to the body 7 and a center portion thereof protrudes.

In other words, the elastic supporting portion 9 has an arc bridge shape of which opposite end portions are integrally connected to the body 7 and a center portion thereof protrudes to be in surface-contact with the second rail 5.

Herein, the elastic supporting portion 9 has the opposite end portions that are spaced from each other in a longitudinal direction of the second rail 5, and thus the elastic supporting portion 9 is formed long in the longitudinal direction of the second rail 5.

Furthermore, the inserting body 11 is inserted between the center portion of the bridge-shaped elastic supporting portion 9 and the body 7.

In other words, the inserting body 11 is inserted with a block shape between an inside space of the center portion of the elastic supporting portion 9 and the body 7.

A plurality of elastic supporting portions 9 is provided at the body 7; and the inserting body 11 may be inserted into the body 7 to supply the elastic force to at least one of the plurality of elastic supporting portions 9.

In other words, in the exemplary embodiment of the present disclosure, the elastic supporting portions 9 includes a side elastic supporting portion 9-1 pressing sideways the second rail 5 and a lower elastic supporting portion 9-2 pressing the second rail 5 from a lower side thereof.

In the exemplary embodiment of the present disclosure, the inserting body 11 is inserted into an insertion groove 13 provided between the side elastic supporting portion 9-1 and the body 7.

Therefore, the side elastic supporting portion 9-1 may secure a state of stably supporting the second rail 5 with the elastic force supplied from the inserting body 11.

Figure 8:
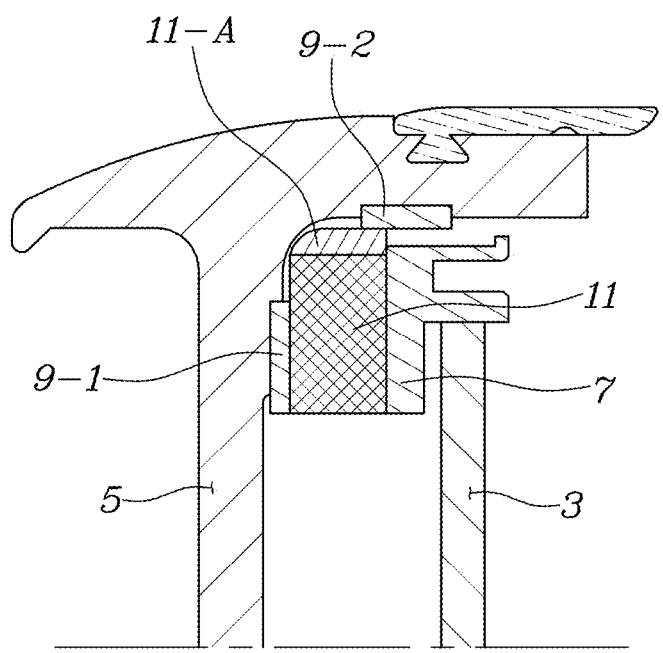
FIG. 8 is a view showing another exemplary embodiment of the present disclosure in comparison to FIG. 7.

Meanwhile, as shown in FIG. 8, the lower elastic supporting portion 9-2 is formed to cover at least a portion of an upper portion of the insertion groove 13; and the inserting body 11 may have an upper supporting portion 11-A, and the upper supporting portion 11-A is integrally formed with the inserting body 11 to elastically support the lower elastic supporting portion 9-2 in an upward direction while the inserting body 11 is inserted in the insertion groove 13.

In the instant case, the side elastic supporting portion 9-1 is elastically supported by the inserting body 11, of course, the lower elastic supporting portion 9-2 also receives the elastic force supplied from the inserting body 11, so that the retainer 1 may support an interval between the first rail 3 and the second rail 5 with the stable elastic force in the sideways direction and the vertical direction.

Figure 7:
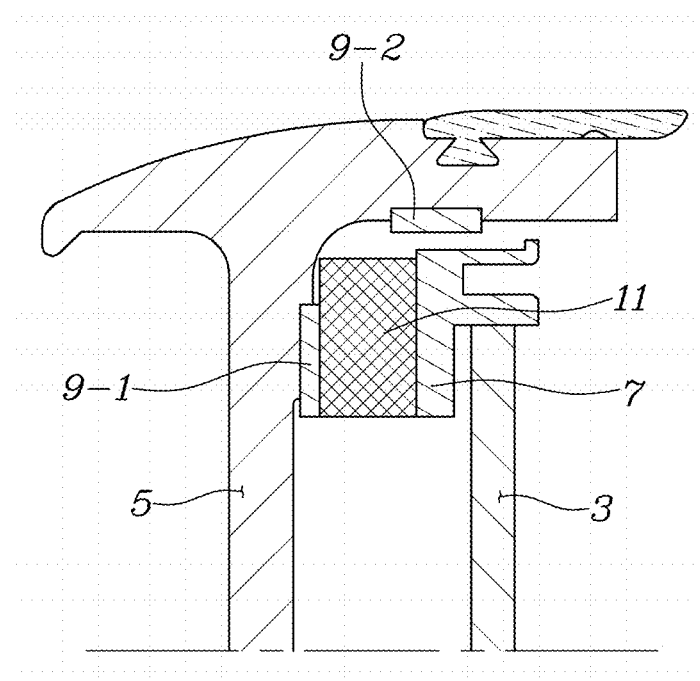
FIG. 7 is a detailed view showing portion VII of FIG. 4.

Herein, because the upper supporting portion 11-A may be integrally formed at the upper side of the inserting body 11 as shown in FIG. 7, the inserting body 11 of FIG. 8 is actually formed, in a vertical length thereof, longer than the inserting body 11 of FIG. 7, and after a lower portion of the inserting body 11 is inserted into the insertion groove 13, an upper portion thereof is assembled by being forcibly pressed to a lower portion of the lower elastic supporting portion 9-2.

As described above, the seat rail retainer 1 of the present disclosure may be expressed as follows.

In other words, according to the exemplary embodiment of the present disclosure, the seat rail retainer 1 includes: the body 7 fixed to the first rail 3; the plurality of elastic supporting portions 9 protruding from the body 7 toward the second rail 5 to elastically support the second rail 5 provided to slide straightly with respect to the first rail 3; the inserting body 11 provided between the body 7 and the elastic supporting portions 9 to supply the elastic force to at least one of the elastic supporting portions 9.

The body 7 includes a mounting groove 15 inserted into and fixed to the first rail 3; and the elastic supporting portions 9 may include the side elastic supporting portion 9-1 supporting a side surface of the second rail 5 and the lower elastic supporting portion 9-2 supporting a lower surface of the second rail 5.

Each of the side elastic supporting portion 9-1 and the lower elastic supporting portion 9-2 may have the arc bridge shape of which opposite end portions are connected to the body 7, and be formed long in a longitudinal direction and a center portion thereof protrudes.

The insertion groove 13 is formed between the body 7 and the side elastic supporting portion 9-1 so that the inserting body 11 is inserted into the insertion groove 13; and the inserting body 11 may be formed in a block shape inserted into the insertion groove 13.

The inserting body 11 is inserted into the insertion groove 13 to elastically support the side elastic supporting portion 9-1, and furthermore, the inserting body 11 may be formed to press upward the lower elastic supporting portion 9-2.

Furthermore, the lower elastic supporting portion 9-2 may be formed to cover a portion of the upper portion of the insertion groove 13 to allow the inserting body 11 to be inserted from above into the insertion groove 13, and to receive the elastic force supplied by the inserting body 11 inserted in the insertion groove 13.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A seat rail retainer apparatus comprising:
a body fixed to a first rail, among the first rail and a second rail that are disposed to slide straightly respectively in a longitudinal direction;
an elastic supporting portion protruding from the body to be elastically pressed by the second rail; and
an inserting body inserted into the body to provide an elastic force to the elastic supporting portion,
wherein the inserting body is block-shaped and is inserted into a space between a center portion of the elastic supporting portion and the body, and
wherein the elastic supporting portion is in plural and the plurality of elastic supporting portions include:
a side elastic supporting portion configured to press sideways the second rail; and
a lower elastic supporting portion configured to press the second rail at a lower side of the second rail, and
wherein the inserting body is inserted into an insertion groove provided between the side elastic supporting portion and the body.

2. The seat rail retainer apparatus of claim 1, wherein the elastic supporting portion has a bridge shape of which opposite end portions are connected to the body and the center portion thereof protrudes.

3. The seat rail retainer apparatus of claim 2, wherein the opposite end portions of the elastic supporting portion are spaced from each other in a longitudinal direction of the second rail, so that the elastic supporting portion is formed in the longitudinal direction of the second rail.

4. The seat rail retainer apparatus of claim 2, wherein the inserting body is inserted into the center portion of the bridge-shaped elastic supporting portion and the body.

5. The seat rail retainer apparatus of claim 1, wherein [the] opposite end portions of the elastic supporting portion are integrally connected to the body, and the center portion thereof is formed in a curved surface protruding to be brought into contact with the second rail.

6. The seat rail retainer apparatus of claim 5, wherein the elastic supporting portion is formed in a longitudinal direction of the second rail.

7. The seat rail retainer apparatus of claim 1,
wherein the lower elastic supporting portion is provided to cover at least a part of an upper portion of the insertion groove, and
wherein the inserting body includes an upper supporting portion which is configured to elastically support upward the lower elastic supporting portion while being inserted into the insertion groove.

8. The seat rail retainer apparatus of claim 1,
wherein the body and the elastic supporting portion are integrally formed of a same material, and
wherein the inserting body is formed of a different material from the body.

9. A seat rail retainer apparatus comprising:
a body fixed to a first rail, among the first rail and a second rail that are disposed to slide straightly respectively in a longitudinal direction;
an elastic supporting portion protruding from the body to be elastically pressed by the second rail; and
an inserting body inserted into the body to provide an elastic force to the elastic supporting portion,
wherein the inserting body is block-shaped and is inserted into a space between a center portion of the elastic supporting portion and the body,
wherein the body and the elastic supporting portion are made of plastic injection molding, and
wherein the inserting body is made of rubber.

10. A seat rail retainer apparatus comprising:
a body fixed to a first rail;
a plurality of elastic supporting portions protruding from the body toward a second rail to elastically support the second rail configured to slide straightly with respect to the first rail; and
an inserting body provided between the body and the plurality of elastic supporting portions to supply an elastic force to at least one of the elastic supporting portions,
wherein the body and the plurality of elastic supporting portions are made of plastic injection molding, and
wherein the inserting body is made of rubber.

11. The seat rail retainer apparatus of claim 10,
wherein the body includes a mounting groove inserted into and fixed to the first rail, and
wherein the plurality of elastic supporting portions includes a side elastic supporting portion supporting a side surface of the second rail and a lower elastic supporting portion supporting a lower surface of the second rail.

12. The seat rail retainer apparatus of claim 11, wherein the side elastic supporting portion and the lower elastic supporting portion each have an arc bridge shape in which opposite end portions thereof are connected to the body and formed in a longitudinal direction and a center portion thereof protrudes.

13. The seat rail retainer apparatus of claim 12,
wherein an insertion groove is formed in a portion between the body and the side elastic supporting portion, so that the inserting body is inserted into the insertion groove, and
wherein the inserting body has a block shape inserted into the insertion groove.

14. The seat rail retainer apparatus of claim 13, wherein the inserting body is inserted into the insertion groove and is configured to elastically support the side elastic supporting portion, and furthermore, is configured to press upward the lower elastic supporting portion.

15. The seat rail retainer apparatus of claim 14, wherein the lower elastic supporting portion is formed to cover a part of an upper portion of the insertion groove to allow the inserting body to be inserted into the insertion groove from above and to receive an elastic force supplied from the inserting body inserted in the insertion groove.

\* \* \* \* \*